UNITED STATES PATENT OFFICE.

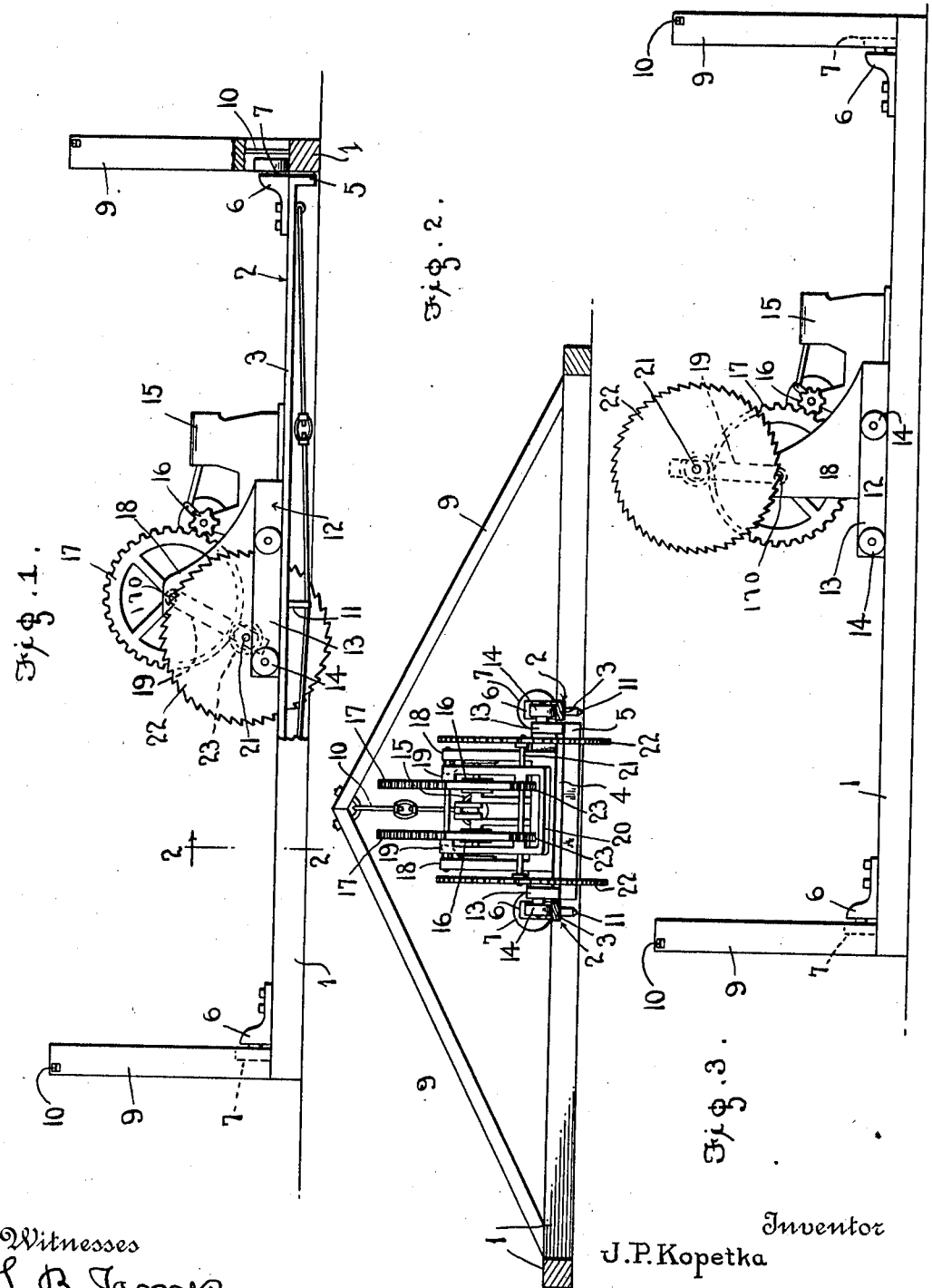

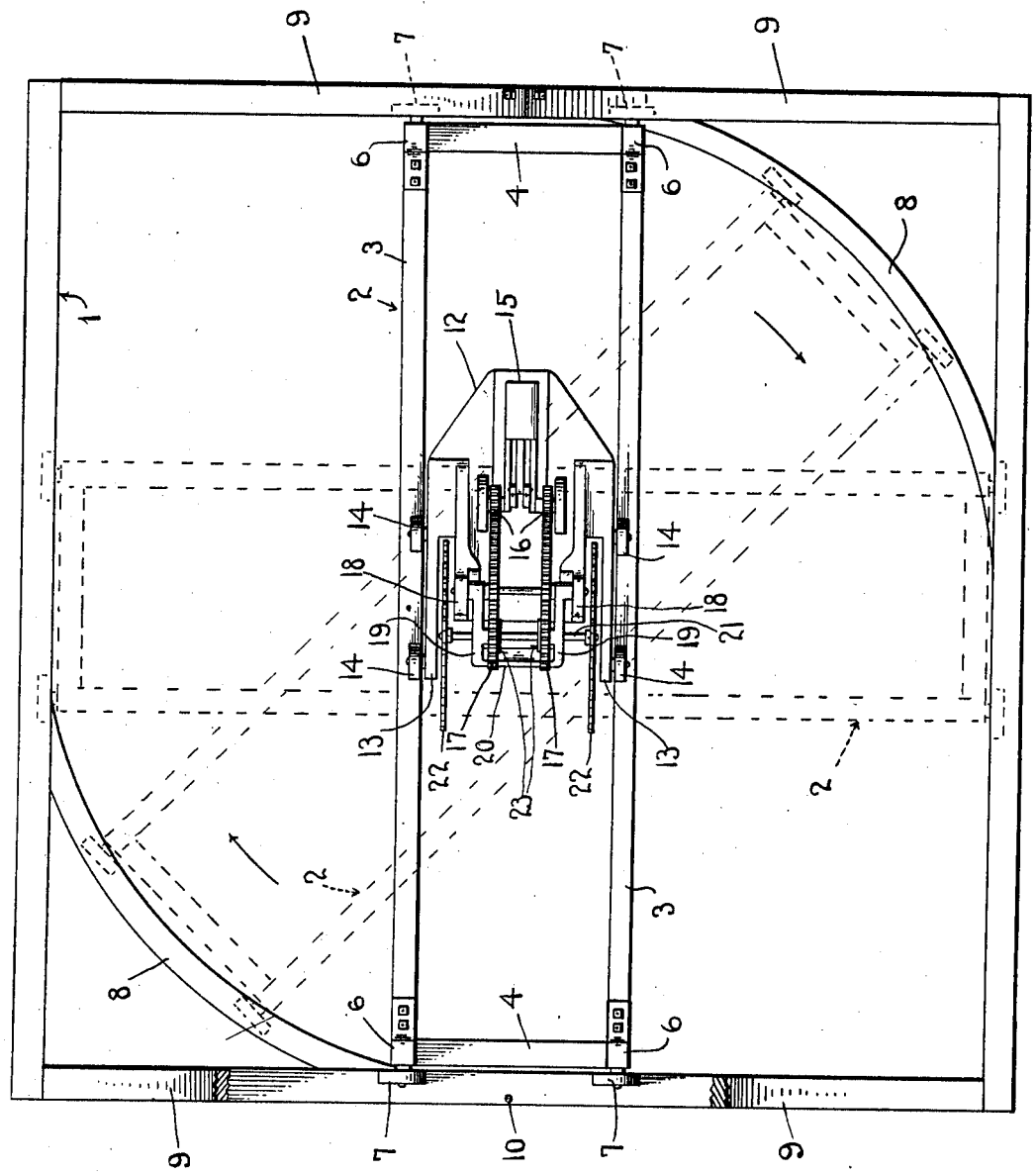

JOSEPH P. KOPETKA, OF BLOOMFIELD, NEBRASKA.

ICE-SAWING MACHINE.

1,021,196.  Specification of Letters Patent.  Patented Mar. 26, 1912.

Application filed June 15, 1911. Serial No. 633,323.

*To all whom it may concern:*

Be it known that I, JOSEPH P. KOPETKA, a citizen of the United States, residing at Bloomfield, in the county of Knox and State of Nebraska, have invented certain new and useful Improvements in Ice-Sawing Machines; and I do declare the following to be a full, clear, and exact description of the invention, such as will enable others skilled in the art to which it appertains to make and use the same.

This invention relates to improvements in ice sawing machines.

One object of the invention is to provide an ice sawing machine having an improved construction and arrangement of saw carriage supporting truck and means whereby the same may be shifted to permit the saw to cut the ice in any direction.

Another object is to provide an improved construction of saw operating mechanism whereby the saws are driven and whereby the same may be swung to an inoperative position while the carriage is being shifted to change the direction of the cuts.

With the foregoing and other objects in view the invention consists of certain novel features of construction, and the combination and arrangement of parts as will be more fully described and claimed.

In the accompanying drawings: Figure 1 is a side view of my improved sawing machine showing the parts in operative position; Fig. 2 is a vertical cross section on the line 2—2 of Fig. 1; Fig. 3 is a view similar to Fig. 1 showing the saws swung to an inoperative position; Fig. 4 is a plan view showing in full and dotted lines the manner in which the carriage is shifted to change the direction of the saws.

My improved ice sawing machine comprises a rectangular supporting frame 1 the side and end bars of which form tracks upon which the truck 2 of the saw is adapted to travel. The truck 2 comprises a pair of parallel longitudinally disposed side bars 3 which form tracks and are connected together at their ends by horizontal cross bars 4 and guide bars 5. On the ends of the side or track bars 3 of the truck are secured bearing blocks 6 on which are revolubly mounted truck supporting rollers 7 which are adapted to travel on either the side or end bars of the main supporting frame 1, thus permitting the truck to be shifted back and forth across the frame. In order to shift the rollers 7 from the tracks formed by the side bars of the frame 1 to the tracks formed by the end bars of said frame, I provide removable segmental track bars 8 which are adapted to be placed in the frame 1 across the space at either of the opposite corners of the frame thus forming substantially turn table tracks upon which the rollers 7 may run when the truck is being turned to a position for changing the direction of the cuts to be made by the saws. The segmental bars 8 are of the same thickness as the side and end bars of the frame 1 and have their ends formed at a suitable angle for closely fitting the inner sides of the side and end bars of the frame 1 as shown. The sides or the ends of the frame 1 are preferably braced by inclined truss braces 9 which are connected to the frame at their ends as shown and are provided with tie rods 10 which connect the central portion of the braces to the central portion of the bars thus firmly bracing and holding the frame 1 against warping or twisting.

The parallel track bars 3 of the truck are preferably braced on their under sides by truss braces 11 and adapted to travel on the upper edges of said track bars is a combined saw and motor supporting carriage 12 comprising side bars 13 on the outer sides of which and adjacent to each end are revolubly mounted carriage supporting rollers 14 which are adapted to travel on the track bars 3 of the truck whereby said carriage may be shifted back and forth to feed the saws to the work. Secured to and arranged between the inner ends of the bars 13 is a motor 15 which may be of any suitable construction and has fixedly mounted on its drive shaft pinions 16 which are adapted to be engaged with gears 17 which are fixedly mounted on a shaft 170 journaled in standards 18 secured to the base of the motor and to the bars 13 as shown. Pivotally connected to the ends of the shaft of the gears 17 are saw supporting bars 19 the lower ends of which are connected together by a cross bar 20. Revolubly mounted on the bars 19 adjacent to their outer ends is a saw supporting and operating shaft 21 on the outer ends of which are fixedly mounted circular parallel ice cutting saws 22. On the shaft 21 is also fixedly mounted driving pinions 23 which are adapted to engage the gears 17 whereby said shaft and the saws are driven by said gears. By mounting the saws on the outer ends of the bars 19 and hingedly connecting said bars with the shaft of the gears 17, said bars together with the saws may be swung upwardly and the latter thus brought to an inoperative position while the truck 2 is being shifted to change the direction of the cuts to be made by the saws. After the truck has been thus adjusted the saw supporting bars 19 and saws may be swung down to bring the latter into engagement with the ice which is then cut by shifting the saw carriage back and forth on the track bars 3 of the truck.

After the ice inclosed within the space occupied by the main frame 1 has been cut in both directions the main frame is shifted to another position and the ice therein cut in the same manner. It will be understood that after the truck has been shifted from one position to another at right angles thereto, the segmental track bars 8 are removed to prevent the same from interfering with the shifting of the truck to permit the saws to make the successive cuts in the ice.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention claimed.

Having thus described my invention, what I claim is:

1. In an ice cutting machine a main supporting frame having outer bars forming two sets of tracks at right angles to each other, segmental tracks adapted to be secured in opposite corners of the frame, a wheeled truck mounted on the tracks whereby it may be shifted over the segmental tracks from one set of tracks to the other and adjusted to any desired angle, a wheeled carriage mounted on the truck, saws on said carriage, and a motor on the carriage for operating the saws.

2. In an ice cutting machine, a rectangular supporting frame having side and end bars adapted to form tracks, a truck comprising longitudinal side bars adapted to form tracks, bearing blocks secured to the ends of said truck bars, truck supporting rollers revolubly mounted on said blocks and adapted to travel on the said supporting frame bars, a saw carriage adapted to travel on the track bars of the truck, a motor arranged on said carriage, a power transmitting shaft revolubly mounted on the carriage, power transmitting gears fixed on said shaft and having an operative engagement with the motor shaft, ice cutting saws, and means to operatively connect said saws with said gears whereby the saws may be swung to operative and inoperative position on the carriage.

3. In an ice sawing machine a rectangular supporting frame comprising side and end bars adapted to form tracks, segmental track bars adapted to be removably engaged with the corners of said supporting frame, truss braces connected to said frame, a truck comprising longitudinal supporting bars adapted to form tracks, cross bars connected to the ends of said longitudinal bars whereby the latter are held in parallel spaced relation, guide bars secured to the ends of said longitudinal bars, truss braces secured to the lower sides of said longitudinal bars, truck supporting rollers revolubly mounted on the ends of said truck bars and adapted to engage and travel on the side and end bars of said supporting frame and on said segmental track bars whereby the truck is adapted to be shifted in different directions, a carriage slidably mounted on said truck bars, said carriage comprising side bars, supporting rollers revolubly mounted thereon and adapted to engage the track bars, bearing standards secured to the carriage, a motor arranged on the latter, a power transmitting shaft revolubly mounted on said bearing standards, gears fixedly mounted on said shaft and having an operative engagement with the shaft of the motor, saw supporting bars pivotally connected at their inner ends to said power transmitting shaft whereby said bars may be swung upwardly to inoperative positions, a saw supporting shaft revolubly mounted on the outer ends of said bars and operatively connected with said gears and saws fixedly mounted on said shaft.

In testimony whereof I have hereunto set my hand in presence of two subscribing witnesses.

JOSEPH P. KOPETKA.

Witnesses:
Emil Coltzan,
C. T. Heckt.

Copies of this patent may be obtained for five cents each, by addressing the "Commissioner of Patents, Washington, D. C."